(12) United States Patent
Sallam et al.

(10) Patent No.: US 7,405,370 B2
(45) Date of Patent: Jul. 29, 2008

(54) VEHICLE OCCUPANT SENSING SYSTEM HAVING ENCLOSED SENSOR ASSEMBLY

(75) Inventors: Faisal K. Sallam, Dearborn, MI (US); Novy A. Medallo, Lapu-lapu (PH); Oliver J. Young, Grosse Pointe Farms, MI (US)

(73) Assignee: Lear Corporation, Southfield, MI (US)

( * ) Notice: Subject to any disclaimer, the term of this patent is extended or adjusted under 35 U.S.C. 154(b) by 352 days.

(21) Appl. No.: 11/085,916

(22) Filed: Mar. 22, 2005

(65) Prior Publication Data

US 2006/0091657 A1    May 4, 2006

Related U.S. Application Data

(63) Continuation-in-part of application No. 10/974,101, filed on Oct. 27, 2004, now abandoned.

(51) Int. Cl.
*H01H 3/14* (2006.01)
(52) U.S. Cl. ............... 200/85 R; 177/199; 340/667; 200/85 A
(58) Field of Classification Search ............... 200/85 R, 200/85 A, 302.1, 302.2; 177/144, 136, 199; 340/665–668; 180/273
See application file for complete search history.

(56) References Cited

U.S. PATENT DOCUMENTS

| | | | |
|---|---|---|---|
| 5,377,108 A | 12/1994 | Nishio | 364/424.05 |
| 5,404,128 A | 4/1995 | Ogino et al. | 340/425.5 |
| 5,413,378 A | 5/1995 | Steffens, Jr. et al. | 280/735 |
| 5,474,327 A | 12/1995 | Schousek | 280/735 |
| 5,485,000 A | 1/1996 | Schneider | 235/494 |
| 5,570,903 A | 11/1996 | Meister et al. | 280/735 |
| 5,594,222 A | 1/1997 | Caldwell | 200/600 |
| 5,653,462 A | 8/1997 | Breed et al. | 280/735 |

(Continued)

FOREIGN PATENT DOCUMENTS

DE    10 2004 031 143 A1    4/2005

(Continued)

OTHER PUBLICATIONS

Aug. 23, 2007, "Patents Act 1977: Search and Examination Report under Sections 17 and 18(3)" for U.K. Patent Application No. GB0605464.7.

(Continued)

*Primary Examiner*—K. Richard Lee
(74) *Attorney, Agent, or Firm*—Bliss McGlynn, P.C.

(57) ABSTRACT

A vehicle occupant sensing system adapted for detecting a condition of a vehicle seat assembly that includes at least one emitter and at least one sensor disposed in spaced relationship to the emitter. The sensor is operable to detect relative distance to the emitter to thereby detect the condition of the vehicle seat assembly. The vehicle occupant sensing system also includes at least one sensor assembly with a base and an upper slide member slidingly supported for movement toward and away from the base. The upper slide member includes an exterior surface that is continuous to thereby block contaminants from entering the sensor assembly. Also, at least one of the emitter and the sensor is supported by the upper slide member. The vehicle occupant sensing system may be employed in a vehicle seat to detect a condition of the vehicle seat.

6 Claims, 6 Drawing Sheets

U.S. PATENT DOCUMENTS

| | | | |
|---|---|---|---|
| 5,668,357 A | 9/1997 | Takiguchi et al. | 200/5 R |
| 5,694,320 A | 12/1997 | Breed | 364/424.055 |
| 5,731,781 A | 3/1998 | Reed | 342/135 |
| 5,739,757 A | 4/1998 | Gioutsos | 340/667 |
| 5,748,473 A | 5/1998 | Breed et al. | 364/424.055 |
| 5,810,392 A | 9/1998 | Gagnon | 280/735 |
| 5,822,707 A | 10/1998 | Breed et al. | 701/49 |
| 5,829,782 A | 11/1998 | Breed et al. | 280/735 |
| 5,835,613 A | 11/1998 | Breed et al. | 382/100 |
| 5,848,802 A | 12/1998 | Breed et al. | 280/735 |
| 5,877,677 A | 3/1999 | Fleming et al. | 340/436 |
| 5,890,758 A | 4/1999 | Pone et al. | 297/15 |
| 5,901,978 A | 5/1999 | Breed et al. | 280/735 |
| 5,931,254 A | 8/1999 | Loraas et al. | 180/272 |
| 5,931,527 A | 8/1999 | D'Onofrio et al. | 297/146 |
| 5,943,295 A | 8/1999 | Varga et al. | 367/99 |
| 5,954,398 A | 9/1999 | Namba et al. | 297/257 |
| 5,971,432 A | 10/1999 | Gagnon et al. | 280/735 |
| 5,975,612 A | 11/1999 | Macey et al. | 296/66 |
| 6,012,007 A | 1/2000 | Fortune et al. | 701/45 |
| 6,020,812 A | 2/2000 | Thompson et al. | 340/438 |
| 6,027,138 A | 2/2000 | Tanaka et al. | 280/735 |
| 6,030,038 A | 2/2000 | Namba et al. | 297/257 |
| 6,039,139 A | 3/2000 | Breed et al. | 180/271 |
| 6,043,743 A | 3/2000 | Saito et al. | 340/562 |
| 6,045,405 A | 4/2000 | Geltsch et al. | 439/620 |
| 6,056,079 A | 5/2000 | Cech et al. | 180/273 |
| 6,059,358 A | 5/2000 | Demick et al. | 297/188.04 |
| 6,078,854 A | 6/2000 | Breed et al. | 701/49 |
| 6,079,763 A | 6/2000 | Clemente | 296/65.05 |
| 6,081,757 A | 6/2000 | Breed et al. | 701/45 |
| 6,088,640 A | 7/2000 | Breed | 701/45 |
| 6,089,641 A | 7/2000 | Mattarella et al. | 296/64 |
| 6,101,436 A | 8/2000 | Fortune et al. | 701/45 |
| 6,102,463 A | 8/2000 | Swanson et al. | 296/37.15 |
| 6,116,639 A | 9/2000 | Breed et al. | 280/735 |
| 6,129,168 A | 10/2000 | Lotito et al. | 180/273 |
| 6,129,404 A | 10/2000 | Mattarella et al. | 296/65.09 |
| 6,134,492 A | 10/2000 | Breed et al. | 701/49 |
| 6,138,067 A | 10/2000 | Cobb et al. | 701/45 |
| 6,141,432 A | 10/2000 | Breed et al. | 382/100 |
| 6,168,198 B1 | 1/2001 | Breed et al. | 280/735 |
| 6,186,537 B1 | 2/2001 | Breed et al. | 280/735 |
| 6,220,627 B1 | 4/2001 | Stanley | 280/735 |
| 6,234,519 B1 | 5/2001 | Breed | 280/735 |
| 6,234,520 B1 | 5/2001 | Breed et al. | 280/735 |
| 6,242,701 B1 | 6/2001 | Breed et al. | 177/144 |
| 6,250,671 B1 | 6/2001 | Osmer et al. | 280/735 |
| 6,250,672 B1 | 6/2001 | Ryan et al. | 280/735 |
| 6,253,134 B1 | 6/2001 | Breed et al. | 701/49 |
| RE37,260 E | 7/2001 | Varga et al. | 367/99 |
| 6,254,127 B1 | 7/2001 | Breed et al. | 280/735 |
| 6,270,116 B1 | 8/2001 | Breed et al. | 280/735 |
| 6,279,946 B1 | 8/2001 | Johnson et al. | 280/734 |
| 6,283,503 B1 | 9/2001 | Breed et al. | 280/735 |
| 6,323,444 B1 | 11/2001 | Aoki | 177/144 |
| 6,324,453 B1 | 11/2001 | Breed et al. | 701/45 |
| 6,325,414 B2 | 12/2001 | Breed et al. | 280/735 |
| 6,330,501 B1 | 12/2001 | Breed et al. | 701/49 |
| 6,342,683 B1 | 1/2002 | Aoki et al. | 177/144 |
| 6,353,394 B1 | 3/2002 | Maeda et al. | 340/667 |
| 6,393,133 B1 | 5/2002 | Breed et al. | 382/100 |
| 6,394,490 B2 | 5/2002 | Osmer et al. | 280/735 |
| 6,397,136 B1 | 5/2002 | Breed et al. | 701/45 |
| 6,407,347 B1 | 6/2002 | Blakesley | 177/144 |
| 6,412,813 B1 | 7/2002 | Breed et al. | 280/735 |
| 6,416,080 B1 | 7/2002 | Gillis et al. | 280/735 |
| 6,422,595 B1 | 7/2002 | Breed et al. | 280/735 |
| 6,442,465 B2 | 8/2002 | Breed et al. | 701/45 |
| 6,442,504 B1 | 8/2002 | Breed et al. | 702/173 |
| 6,445,988 B1 | 9/2002 | Breed et al. | 701/45 |
| 6,452,870 B1 | 9/2002 | Breed et al. | 367/99 |
| 6,457,545 B1 | 10/2002 | Michaud et al. | 180/272 |
| 6,474,739 B1 | 11/2002 | Lagerweij | 297/341 |
| 6,476,514 B1 | 11/2002 | Schondorf | 307/10.1 |
| 6,506,069 B2 | 1/2003 | Babala et al. | 439/248 |
| 6,605,877 B1 | 8/2003 | Patterson et al. | 307/10.1 |
| 6,609,054 B2 | 8/2003 | Wallace | 701/45 |
| 2002/0003345 A1 | 1/2002 | Stanley et al. | 280/735 |
| 2002/0056975 A1 | 5/2002 | Yoon et al. | 280/735 |
| 2002/0079728 A1 | 6/2002 | Tame | 297/344.1 |
| 2002/0098730 A1 | 7/2002 | Babala et al. | 439/248 |
| 2002/0195807 A1 | 12/2002 | Ishida | 280/735 |
| 2003/0040858 A1 | 2/2003 | Wallace | 701/144 |
| 2003/0071479 A1 | 4/2003 | Schaller et al. | 296/144 |
| 2003/0090133 A1 | 5/2003 | Nathan et al. | 297/144 |
| 2003/0106723 A1 | 6/2003 | Thakur et al. | 177/144 |
| 2003/0111276 A1 | 6/2003 | Kajiyama | 177/144 |
| 2003/0164715 A1 | 9/2003 | Lester | 324/661 |
| 2003/0171036 A1 | 9/2003 | Aujla et al. | 439/660 |
| 2003/0189362 A1 | 10/2003 | Lichtinger et al. | 297/217.3 |
| 2003/0196495 A1 | 10/2003 | Saunders et al. | 73/862.041 |
| 2003/0220766 A1 | 11/2003 | Saunders et al. | 702/173 |
| 2005/0029843 A1 | 2/2005 | Young et al. | 297/217.1 |

FOREIGN PATENT DOCUMENTS

| | | |
|---|---|---|
| EP | 0 099 278 A1 | 1/1984 |
| EP | 0 689 967 A1 | 3/1996 |
| EP | 0960039 | 8/1998 |
| EP | 0 993 013 A1 | 4/2000 |
| GB | 2 367 346 | 4/2002 |
| GB | 2 403 296 | 12/2004 |
| GB | 2 403 348 | 12/2004 |
| WO | WO 98/41424 | 3/1997 |

OTHER PUBLICATIONS

Sep. 6, 2007 "Office Action" for U.S. Appl. No. 11/085,915.
Dec. 6, 2007 "Amendment" for U.S. Appl. No. 11/085,915.
Dec. 19, 2006 "Office Action" for U.S. Appl. No. 11/086,844.
Feb. 20, 2007 "Response to Office Action" for U.S. Appl. No. 11/086,844.
Jun. 6, 2007 "Office Action" for U.S. Appl. No. 11/086,844.
Sep. 6, 2007 "Amendment" for U.S. Appl. No. 11/086,844.
Nov. 27, 2007 "Notice of Allowance" for U.S. Appl. No. 11/086,844.
Dec. 12 ,2007 "Office Action" for U.S. Appl. No. 11/085,914.
Jan. 10, 2008 "Amendment" for U.S Appl. No. 11/085,914.

VEHICLE OCCUPANT SENSING SYSTEM HAVING ENCLOSED SENSOR ASSEMBLY

CROSS REFERENCE TO RELATED APPLICATION

The following is a continuation-in-part of U.S. Ser. No. 10/974,101, filed Oct. 27, 2004, and entitled "Vehicle Occupant Sensing System Having a Contamination Barrier Member," now abandoned.

BACKGROUND OF THE INVENTION

1. Field of the Invention

The present invention relates, generally, to a vehicle occupant sensing system, and more particularly, to a vehicle occupant sensing system having an enclosed sensor assembly.

2. Description of the Related Art

Automotive vehicles employ seating systems that accommodate the passengers of the vehicle. The seating systems include restraint systems that are calculated to restrain and protect the occupants in the event of a collision. The primary restraint system commonly employed in most vehicles today is the seatbelt. Seatbelts usually include a lap belt and a shoulder belt that extends diagonally across the occupant's torso from one end of the lap belt to a mounting structure located proximate to the occupant's opposite shoulder.

In addition, automotive vehicles may include supplemental restraint systems. The most common supplemental restraint system employed in automotive vehicles today is the inflatable airbag. In the event of a collision, the airbags are deployed as an additional means of restraining and protecting the occupants of the vehicle. Originally, the supplemental inflatable restraints (airbags) were deployed in the event of a collision whether or not any given seat was occupied. These supplemental inflatable restraints and their associated deployment systems are expensive and over time this deployment strategy was deemed not to be cost effective. Thus, there became a recognized need in the art for a means to selectively control the deployment of the airbags such that deployment occurs only when the seat is occupied.

Partially in response to this need, vehicle safety systems have been proposed that include vehicle occupant sensing systems capable of detecting whether or not a given seat is occupied. The systems act as a switch in controlling the deployment of a corresponding air bag. If the occupant sensing device detects that a seat is unoccupied during a collision, it can prevent the corresponding air bag from deploying, thereby saving the vehicle owner the unnecessary cost of replacing the expended air bag.

Furthermore, many airbag deployment forces and speeds have generally been optimized to restrain one hundred eighty pound males because the one hundred eighty pound male represents the mean average for all types of vehicle occupants. However, the airbag deployment force and speed required to restrain a one hundred eighty pound male exceeds that which are required to restrain smaller occupants, such as some females and small children. Thus, there became a recognized need in the art for occupant sensing systems that could be used to selectively control the deployment of the airbags when a person below a predetermined weight occupies the seat.

Accordingly, other vehicle safety systems have been proposed that are capable of detecting the weight of an occupant. In one such inflatable restraint system, if the occupant's weight falls below a predetermined level, then the system can suppress the inflation of the air bag or will prevent the air bag from deploying at all. This reduces the risk of injury that the inflating air bag could otherwise cause to the smaller-sized occupant.

Also, many airbag deployment forces and speeds have generally been optimized to restrain a person sitting generally upright toward the back of the seat. However, the airbag deployment force and speed may inappropriately restrain a person sitting otherwise. Thus, there became a recognized need in the art for a way to selectively control the deployment of an airbag depending on the occupant's sitting position.

Partially in response to this need, other vehicle safety systems have been proposed that are capable of detecting the position of an occupant within a seat. For example, if the system detects that the occupant is positioned toward the front of the seat, the system will suppress the inflation of the air bag or will prevent the air bag from deploying at all. This reduces the risk of injury that the inflating air bag could otherwise cause to the occupant. It can be appreciated that these occupant sensing systems provide valuable data, allowing the vehicle safety systems to function more effectively to reduce injuries to vehicle occupants.

One necessary component of each of the known systems discussed above includes some means for sensing the presence of the vehicle occupant in the seat. One such means may include a sensor device supported within the lower seat cushion of the vehicle seat. For example, published U.S. patent application having U.S. Ser. No. 10/249,527 and Publication No. US2003/0196495 A1 filed in the name of Saunders et al. discloses a method and apparatus for sensing seat occupancy including a sensor/emitter pair that is supported within a preassembled one-piece cylinder-shaped housing. The housing is adapted to be mounted within the seat cushion in a hole extending from the B-surface toward the A-surface of the seat cushion. The sensor/emitter pair supported in the housing includes an emitter and a sensor spaced below the emitter. The cylindrical housing is formed of a compressible, rubber-like material that is responsive to loads placed on the upper surface of the seat cushion. The housing compresses in response to a load on the seat cushion. The load is detected through movement of the emitter toward the sensor as the housing is compressed. The housing is sufficiently resilient to restore the emitter to full height when no load is applied to the upper surface of the seat cushion. The Saunders et al. system also includes a processor for receiving the sensor signals and interpreting the signals to produce an output to indicate the presence of an occupant in the seat.

While the Saunders et al. occupant seat sensing system teaches a sensor/emitter pair that may sense the presence of a vehicle seat occupant, it suffers from certain disadvantages. For example, a printed flexible circuit is attached to the B-surface of the seat cushion to enclose the housing within the seat cushion. Over time, the flexible circuit can become detached from the seat cushion, thereby opening a path for contaminants, such as foam particles, rainwater, etc., to contact and enter the housing. These contaminants can interfere with the motion of the emitter toward and/or away from the sensor, cause the sensor to malfunction, or otherwise degrade the accuracy of the system.

Therefore, there is an ongoing need in the art for a vehicle occupant sensing system that is substantially resistant to shear forces and is otherwise constructed to respond primarily in a single axis of movement. In addition, there is an ongoing need for a vehicle occupant sensing system that is less prone to contamination.

SUMMARY OF THE INVENTION

The present invention overcomes the disadvantages in the related art in a vehicle occupant sensing system adapted for detecting a condition of a vehicle seat assembly that includes at least one emitter and at least one sensor disposed in spaced relationship to the emitter. The sensor is operable to detect relative distance to the emitter to thereby detect the condition of the vehicle seat assembly. The vehicle occupant sensing system also includes at least one sensor assembly with a base and an upper slide member slidingly supported for movement toward and away from the base. The upper slide member includes an exterior surface that is continuous to thereby block contaminants from entering the sensor assembly. Also, at least one of the emitter and the sensor is supported by the upper slide member. The vehicle occupant sensing system may be employed in a vehicle seat to detect a condition of the vehicle seat.

Advantageously, the sensor assembly is substantially enclosed to inhibit contaminants, such as foam particles, rainwater, or other foreign substances, from contacting and detrimentally affecting the operation of the vehicle occupant sensing system. As such, the sensor assembly extends the operating life of the vehicle occupant sensing system.

Other features and advantages of the present invention will be readily appreciated, as the same becomes better understood, after reading the subsequent description taken in conjunction with the accompanying drawings.

DETAILED DESCRIPTION OF THE PREFERRED EMBODIMENT(S)

Figure 1:
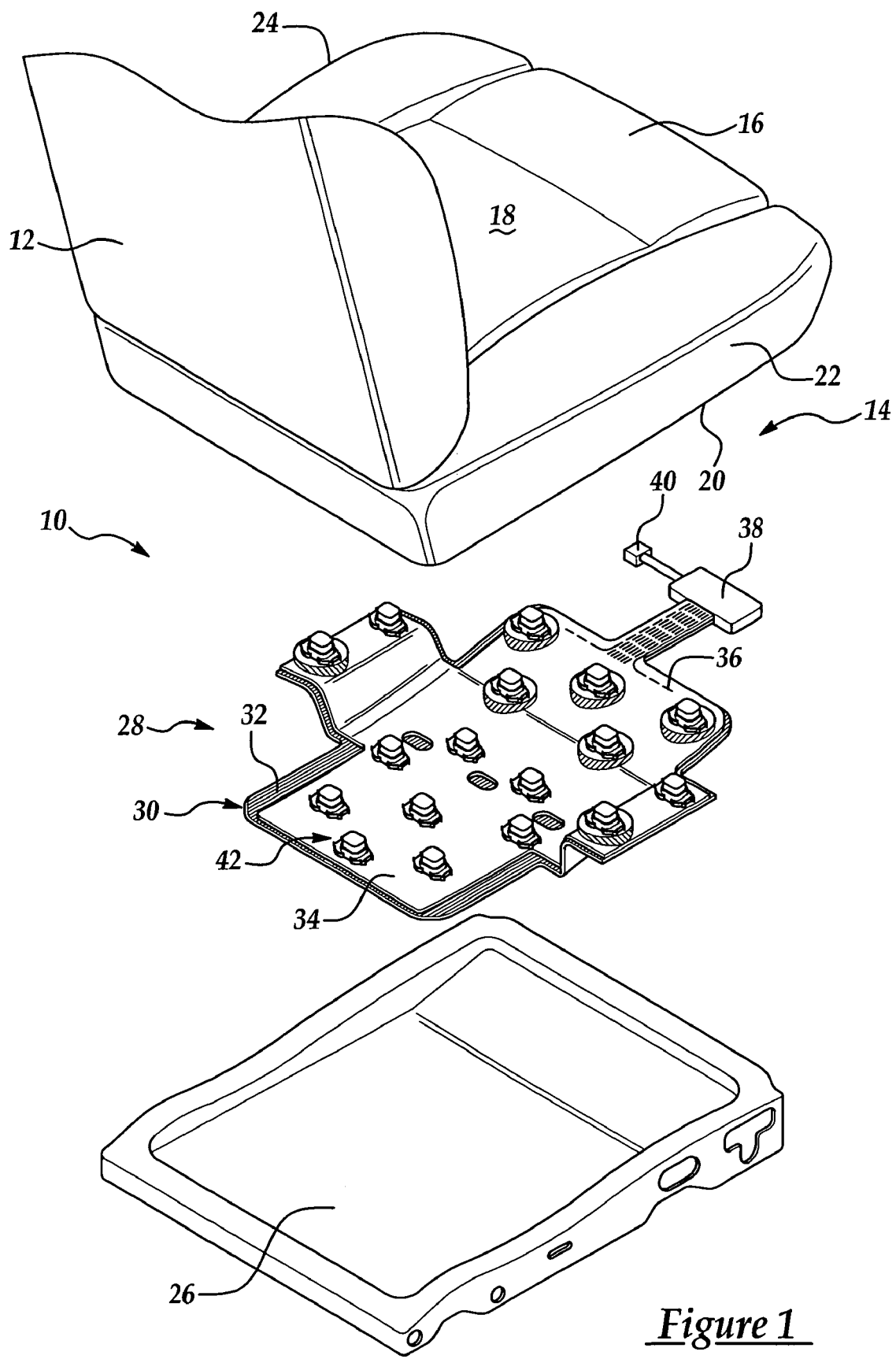
FIG. 1 is an exploded view of a vehicle seat assembly incorporating a vehicle occupant sensing system having contamination barrier members that act to reduce contamination of the vehicle occupant sensing system.

Referring now to the drawings, where like numerals are used to designate like structure throughout the figures, an exploded view of one embodiment of the vehicle seat assembly of the present invention is generally indicated at 10 in FIG. 1. The vehicle seat assembly 10 includes a seat back, generally indicated at 12, and a lower seat assembly, generally indicated at 14. The lower seat assembly 14 has a seat cushion 16 with an upper surface 18 and a lower surface 20 that is spaced from the upper surface 18. The upper surface 18 of the seat cushion 16 may be referred to as the "A-surface" and the lower surface 20 may be referred to as the "B-surface." The seat cushion 16 also defines an inboard side 22 and an outboard side 24. When an occupant (not shown) is supported on the lower seat assembly 14, the weight of the occupant will apply an axial load directed generally through the upper surface 18 of the seat cushion 16 toward the lower surface 20. Although the weight of the occupant will induce an axial as well as shear forces in the seat cushion 16, those having ordinary skill in the art will recognize that the primary load path of the occupant's weight will be substantially vertical from the upper surface 18 toward the lower surface 20, through the seat cushion 16.

The lower seat assembly 14 also includes a seat pan, generally indicated at 26. The seat pan 26 is generally disposed beneath the lower surface 18 so as to support the seat cushion 16. In turn, the seat pan 26 is operatively supported relative to the floor of the vehicle using any suitable structure of the type commonly known in the art, such as a seat track (not shown). In addition, the vehicle seat assembly 10 includes a vehicle occupant sensing system, generally indicated at 28 and disposed adjacent the lower surface 20 of the seat cushion 16. The vehicle occupant sensing system 28 is used for detecting a condition of the vehicle seat assembly 10, such as whether or not the vehicle seat assembly 10 is occupied, whether the occupant is above or below a certain weight requirement, or whether the occupant is sitting in a certain position.

The sensing system 28 includes a circuit carrier tray, generally indicated at 30, that is supported by the seat pan 26. The tray 30 includes an upper surface 32 adjacent the lower surface 20 of the seat cushion 16. In the preferred embodiment, the tray 30 is of the type described in detail in applicant's co-pending patent application Ser. No. 10/749,169, entitled "Vehicle Occupant Sensing System Having Circuit Carrier Tray," which is incorporated herein in its entirety by reference. The tray 30 supports components of the vehicle occupant sensing system 28 as will be described in greater detail below.

The vehicle occupant sensing system 28 also includes a circuit carrier 34, which is disposed adjacent the lower surface 20 of the seat cushion 16. The tray 30 supports the circuit carrier 34 on the upper surface 32.

The vehicle occupant sensing system 28 also includes an electric circuit 36, which is supported by the circuit carrier 34. Specifically, the circuit carrier 34 is made of a thin nonconductive and corrosion-resistant material, and it encapsulates known electrical components that form the electric circuit 36. For instance, in one embodiment, a flexible printed circuit forms the circuit carrier 34 and electric circuit 36.

The circuit 36 is electrically connected to a controller schematically illustrated at 38. As described in greater detail below, the electric circuit 38 carries electric signals generated by the vehicle occupant sensing system 28 to the controller 38. The controller 38 is electrically attached to a restraint system, schematically illustrated at 40. The restraint system 40 can be of many types, such as an inflatable restraint system, and the controller 38 sends output to the restraint system 40 based on the signals delivered by the electric circuit 36. Although an inflatable restraint system is discussed here, one having ordinary skill in the art will recognize that the type of restraint system 40 connected to the controller 38 does not limit the scope of the present invention.

The vehicle occupant sensing system 28 also includes at least one, and preferably a plurality of, sensor assemblies, generally indicated at 42. The sensor assemblies 42 are operatively supported by the tray 30 so as to be disposed adjacent the lower surface 20 of the seat cushion 16. In one embodiment, the lower surface 20 includes a plurality of depressions, and each of the sensor assemblies 42 are spaced according to a corresponding depression formed in the lower surface 20 of the lower seat cushion 16 such that individual sensor assemblies 42 are positioned in a corresponding depression. As will be discussed in greater detail below, the sensor assemblies 42 are responsive to loading of the seat cushion 16. The response of the sensor assemblies 42 is communicated to the controller 38 so as to detect the condition of the seat assembly 10, such as whether or not it is occupied, whether or not the occupant weighs a predetermined amount, and/or whether or not the occupant is sitting in a predetermined position. The sensor assemblies 42 are substantially resistant to shear forces from the seat cushion 16. Furthermore, the sensor assemblies 42 are substantially protected from contamination to thereby extend the operating life of the vehicle occupant sensing system 28 as will be described in greater detail below.

Figure 2:
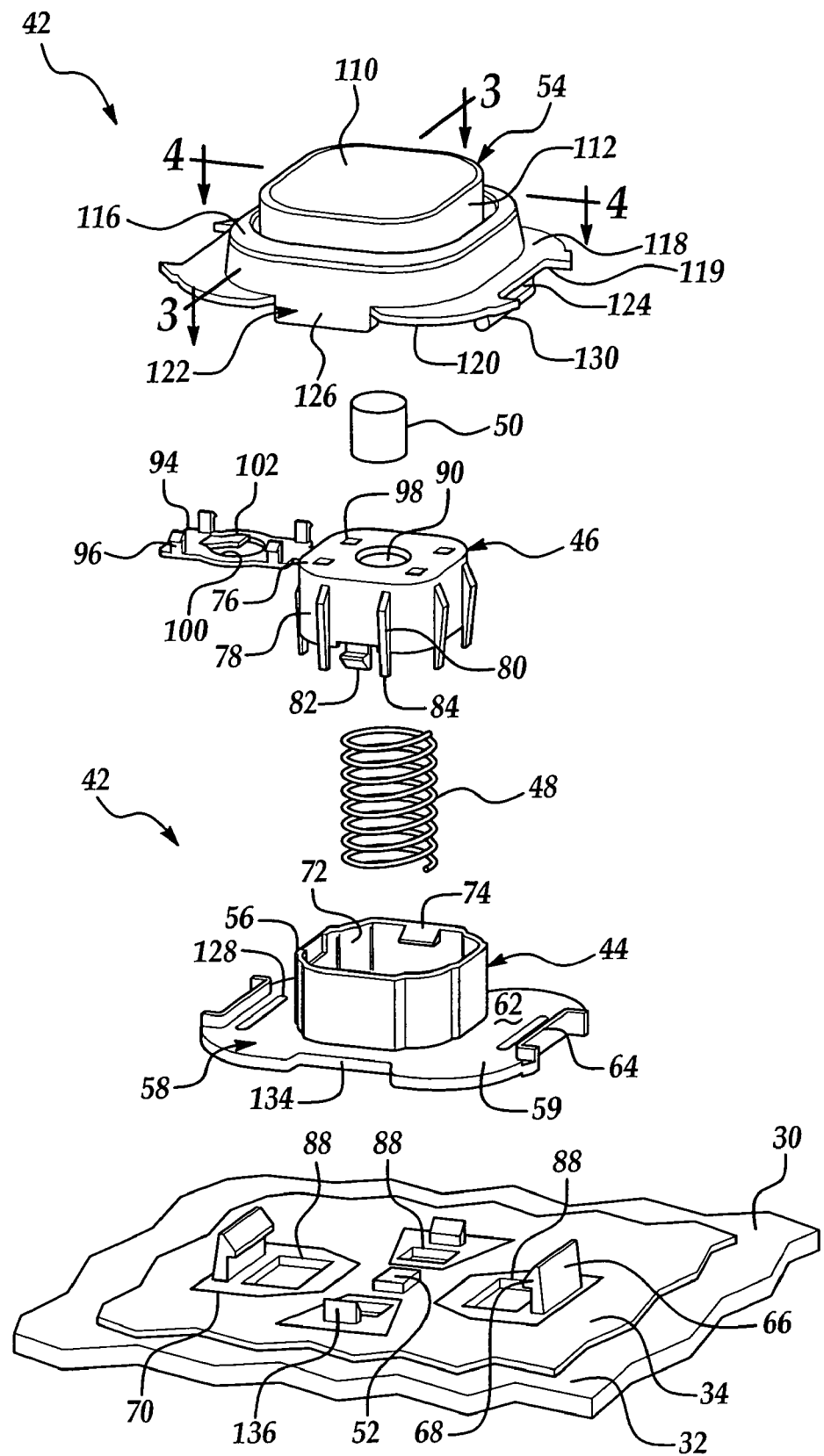
FIG. 2 is an exploded view of one embodiment of a sensor assembly suitable for use in the vehicle occupant sensing system illustrated in FIG. 1.

One embodiment of the sensor assembly 42 and its means for mounting to the tray 30 is shown in FIG. 2. The sensor assembly 42 shown is indicative of each of the sensor assemblies 42 shown in FIG. 1. The sensor assembly 42 includes a base, generally indicated at 44, and an upper slide member, generally indicated at 46. The base 44 is fixed to the tray 30, and the upper slide member 46 is supported for movement toward and away from the base 44. In the embodiment shown, the upper slide member 46 is slidably attached to the base 44 for movement toward and away from the base 44. The sensor assembly 42 also includes a biasing member 48, such as a coiled spring, that acts to bias the upper slide member 46 away from the base 44. The sensor assembly 42 also includes an emitter 50, such as a permanent magnet, mounted to the upper slide member 46. The vehicle occupant sensing system 28 also includes at least one, and preferably a plurality of sensors 52. In one embodiment, each sensor 52 is a Hall effect sensor 52 operatively attached to the circuit carrier 34 so as to be in electrical communication with the circuit 36. Those having ordinary skill in the art will appreciate that the vehicle occupant sensing system 28 could employ a biasing member 48, emitter 50, and sensor 52 of any suitable type including a biasing member 48 other than a coiled spring, an emitter 50 other than a coiled magnet, and/or a sensor 52 other than a Hall effect sensor without departing from the scope of the invention.

Operative attachment between the sensor 52 and the circuit carrier 34 can be accomplished in any suitable manner including that which is described in applicant's co-pending application Ser. No. 10/748,514, entitled "Vehicle Occupant Sensing System and Method of Electrically Attaching a Sensor to an Electrical Circuit," which is hereby incorporated in its entirety by reference. The sensor 52 is operable to detect the relative distance to the emitter 50 as will be described in greater detail below. Because the emitter 50 is mounted to the upper slide member 46, the sensor 52 is operable to detect movement of the upper slide member 46 toward and away from the base 44. Thus, when the seat cushion 16 is occupied, the upper slide members 46 of each sensor assembly 42 slide accordingly toward the respective bases 44, and the sensors 52 detect the change in distance to the respective emitters 50. The sensors 52 transmit correlative signals to the controller 38, and the controller 38 sends output to the restraint system 40 based on those signals. It should be appreciated that when the seat cushion 16 is unoccupied, the sensors 52 can also detect the relative distance to the respective emitters 50 to detect that the seat assembly 10 is unoccupied as well. Therefore, operation of the restraint system 40 can depend on the condition of the seat assembly 10. For instance, assuming the restraint system 40 is an airbag system and that the vehicle occupant sensing system 28 detects that the seat assembly 10 is unoccupied, the restraint system 40 can disengage and prevent the airbag from deploying. Likewise, if the vehicle occupant sensing system 28 detects that the occupant weighs a certain amount and/or that the occupant is sitting in a certain position, the airbag can be inflated in a manner that safely restrains such an occupant.

As will be discussed in greater detail below, the vehicle occupant sensing system 28 of the present invention also includes at least one, and preferably, a plurality of contamination barrier members, generally indicated at 54. Each sensor assembly 42 has a contamination barrier 54 operatively attached thereto. Generally, the barrier members 54 at least partially encapsulate the respective upper slide member 46 and base 44 so as to decrease contamination of the sensor assembly 42 as will be discussed in greater detail below.

Figure 3:
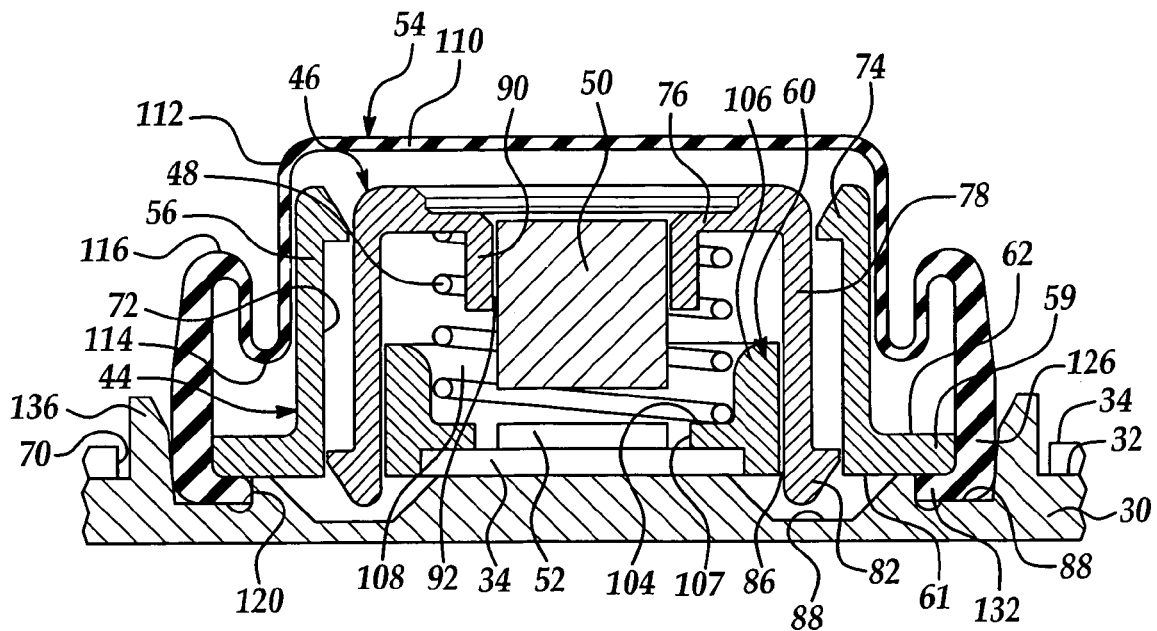
FIG. 3 is a cross-sectional side view of the sensor assembly of FIG. 2 shown in a compressed state.
Figure 4:
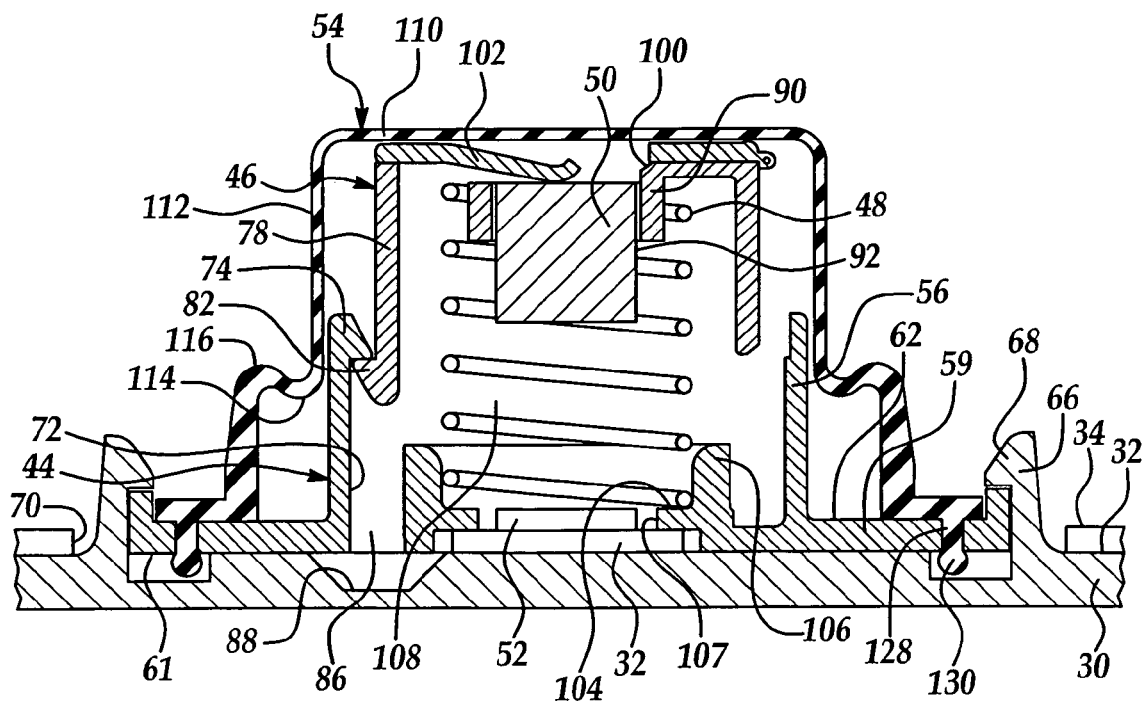
FIG. 4 is a cross-sectional side view of the sensor assembly of FIG. 2 shown in an uncompressed state.

Referring now to FIGS. 2-4, one specific embodiment of the sensor assembly 42, barrier member 54, and their means of attachment within the vehicle occupant sensing system 28 will be discussed. It should be appreciated, however, that the barrier member 54 could be incorporated into other vehicle occupant sensing systems, such as those shown and described in applicant's co-pending applications, U.S. Ser. No. 10/606,649, entitled "Encapsulated Spring Sensor Assembly" and filed Jun. 26, 2003, and/or U.S. Ser. No. 10/748,536, entitled "Vehicle Occupant Sensing System Having a Low Profile Sensor Assembly" and filed Dec. 30, 2003, which are hereby incorporated in their entirety by reference.

As shown in FIGS. 2-4, the base 44 includes a base guide 56, which is shaped like a rectangular tube. The base 44 also includes a retainer, generally indicated at 58. The retainer 58 is disc-shaped and is integrally attached to one terminal end of the base guide 56. The retainer 58 includes an exterior flange 59, which extends outwardly from the base guide 56, and an interior platform, generally indicated at 60, disposed within the base guide 56.

The exterior flange 59 of the retainer 58 includes a substantially flat bottom side 61 and top side 62. The bottom side 60 is supported above the upper surface 32 of the tray 30. The retainer 58 includes a plurality of retaining ridges 64. The ridges 64 are curved inward from the outer periphery of the retainer 58 and extend upwardly from the top side 62 of the retainer 58. In the embodiment shown, the ridges 64 are disposed on opposite sides of the retainer 58. The tray 30 includes a plurality of clips 66. The clips 66 each extend upwardly from the upper surface 32 of the tray 30 and end in a triangular head 68. The circuit carrier 34 includes a plurality of openings 70 through which the clips 66 extend through the circuit carrier 34 toward the base 44. To connect the base 44 to the tray 30, the base 44 is moved axially toward the upper surface 32 of the tray 30. As the clips 66 contact the retaining ridges 64, the clips 66 bend outwardly. As the base 44 moves further, the clips 66 bend back and the heads 68 move over the retaining ridges 64, thereby mounting the base 44 to the tray 30.

The base guide 56 has an inner surface 72. The base guide 56 includes at least one, and preferably, a plurality of upper flange members 74. The flange members 74 are each triangular shaped, positioned at ninety degrees (90°) away from each other on an upper edge of the inner surface 72, and face inwardly from the inner surface 72. The inner surface 72 of the base guide 56 is used to guide movement of the upper slide member 46, and the upper flange members 74 are used to limit movement of the upper slide member 46 as will be discussed in greater detail below.

The upper slide member 46 includes an upper disc portion 76 and a continuous support wall 78 extending axially downward from the outer periphery of the upper disc portion 76. The support wall 78 is sized according to that of the inner surface 72 of the base guide 56 such that the upper slide member 46 can move within the base guide 56.

In the embodiment shown, the upper slide member 46 includes at least one, and preferably, a plurality of ribs 80. Each rib 80 is generally straight and extends outwardly from the support wall 78. The ribs 80 are spaced apart from each other about the support wall 78. Preferably, the ribs 80 extend outward from the support wall 78 so as to contact the inner surface 72 of the base guide 56. Contact between the ribs 80 and the inner surface 72 of the base 44 guides the sliding movement of the upper slide member 46 relative to the base 44. Specifically, the upper slide member 46 moves axially with respect to the base 44, and is substantially inhibited from tilting or rotating relative to the base 44 because of the contact between the ribs 80 and inner surface 72 of the base 44. Thus, the upper slide member 46 is largely unaffected by shear forces in the seat cushion 16. Furthermore, the ribs 80 reduce surface area contact between the upper slide member 46 and the inner surface 72 of the base 44. In turn, the ribs 80 reduce friction between the upper slide member 46 and the base 44 as the upper slide member 46 moves. The ribs 80 and the inner surface 72 can also be polished in order to further reduce friction.

In the embodiment shown, the ribs 80 include lower ends 84 extending away from the lower edge of the support wall 78. The platform 60 includes openings 86 positioned below the lower ends 84 formed on each rib 80. The tray 30 also includes pockets 88 positioned below the lower ends 84 and the openings 86. Preferably, the lower ends 84, the openings 86, and the pockets 88 are aligned such that the lower ends 84 move through the openings 86 and into the pockets 88. Advantageously, these features allow the upper slide member 46 to move farther toward the base 44, such that the sensor assembly 42 is less likely to detrimentally affect the comfort of the vehicle seat assembly 10.

The upper slide member 46 also includes at least one, and preferably, a plurality of lower flange members 82. The lower flange members 82 are each triangular shaped, extend from a lower edge of the support wall 78, and face outwardly therefrom. The lower flange members 82 are spaced according to that of the upper flange members 74 of the base 44. To attach the upper slide member 46 to the base 44, the upper slide member 46 is moved axially toward the base 44 until the lower flange members 82 contact the upper flange members 74. Further movement of the upper slide member 46 bends the lower flange members 82 inward, and still further movement allows the lower flange members 82 to bend back underneath the upper flange members 74. Once attached, movement of the upper slide member 46 away from the base 44 eventually causes the lower flange members 82 to contact the upper flange members 74. Thus, the lower flange members 82 and the upper flange members 74 cooperate to define the limit of sliding movement of the upper slide member 46 away from the base 44.

On the other hand, the platform 60 of the base 44 and the lower edge of the support wall 78 of the upper slide member 46 cooperate to define the limit of sliding movement of the upper slide member 46 toward the base 44. More specifically, as the upper slide member 46 moves toward the base 44, the lower edge of the support wall 78 contacts the platform 60 of the base 44, thereby limiting further movement. The lower ends 84 of the ribs 80 and the tray 20 can cooperate to define the limit of movement of the upper slide member 46 toward the base 44 in addition to or as an alternative to the support wall 78 and platform 60.

Furthermore, the upper slide member 46 includes a retainer 90. The retainer 90 is cup-shaped and extends in the general direction of the base 50 from the center of the upper disc portion 76 of the upper slide member 46. The emitter 50 is disposed within the retainer 90, and the bottom and sides of the emitter 50 are supported therein. As shown in FIGS. 3 and 4, the retainer 90 includes slots 92 extending across the bottom surface of the emitter 50, thereby partially exposing the bottom surface of the emitter 50.

In the embodiment shown, the upper slide member 46 also includes an interference member 94. The interference member 94 can be built according to applicant's co-pending application, U.S. Ser. No. 10/899,192, entitled "Vehicle Occupant Sensing System Having an Upper Slide Member with an Emitter Interference Member" and filed Jul. 26, 2004. In the embodiment shown, the interference member 94 is generally flat and is hingeably attached at one end to the upper disc portion 76 of the upper slide member 46. The interference member 94 includes a plurality of clips 96, and the upper disc portion 76 includes a corresponding plurality of apertures 98. The interference member also includes an opening 100 with an interference arm 102 that extends from the periphery of the opening 100 into the opening 100. As such, when the emitter 50 is positioned within the retainer 90, the interference member 94 can be pivoted over the retainer 90, and the clips 96 can be attached within the apertures 98 to the upper slide member 46. With the interference member 94 in this position, the interference arm 102 preferably contacts and biases the emitter 50 into the retainer 90. Thus, the interference member 94 mounts the emitter 50 to the upper slide member 46 in a more robust manner.

As stated above, the sensor assembly 42 includes a biasing member 48. The biasing member 48 is a coiled spring in the embodiment shown. As best seen in FIGS. 3 and 4, one end of the biasing member 48 is supported by a mounting surface 104 the platform 60 of the base 44. The platform 60 includes ridge 106 extending upward from and centered about the mounting surface 104 to thereby keep the biasing member 48 centered atop the mounting surface 104. The opposite end of the biasing member 48 is disposed about the retainer 90 and contacts the bottom surface of the upper disc portion 76 of the upper slide member 46 such that the biasing member 48 biases the upper slide member 46 away from the base 44. Preferably, the biasing member 48 causes the lower flange members 82 of the upper slide member 46 to contact the upper flange members 74 of the base 44 when the seat cushion is unoccupied.

The platform 60 of the base 44 also includes an opening 107 positioned at the center of the base 44. The opening 107 provides clearance for the sensor 52. Preferably, the sensor 52 is aligned with the emitter 50 as the upper slide member 46 moves toward and away from the base 44 for accurate detection of the distance between the emitter 50 and sensor 52.

Thus, the base 44 and the upper slide member 46 cooperate to define an interior cavity 108 of the sensor assembly 42. The sensor 52 and the biasing member 48 are disposed within the interior cavity 108. Contamination of the interior cavity 108 may cause the sensor 52 and/or biasing member 48 to malfunction. For example, dust particles and/or foam particles from the seat cushion 16 could enter the interior cavity 108 and inhibit the upper slide member 46 from moving in its preferred manner. Likewise, rainwater or other liquids could enter the interior cavity 108 and cause the sensor 52 to malfunction. Thus, the vehicle occupant sensing system 28 of the present invention includes the contamination barrier member 54 to at least partially encapsulate the upper slide member 46 and base 44 so as to decrease contamination of the interior cavity 108 of the sensor assembly 42.

In the embodiment shown, the barrier member 54 is a single, unitary member that includes a flat, upper platform 110 and a wall 112. The wall 112 is contoured to accommodate the shape of the sensor assembly 42. To this end, in the embodiment shown, the wall 112 initially extends downward from the periphery of the upper platform 110, then bends upward 180° at a first bend 114, and then bends downward 180° at a second bend 116. The barrier member 54 also includes a lower flange 118, which is integrally attached to the lower terminal end of the wall 112 and extends outwardly therefrom in a horizontal direction as best seen in FIG. 2. The lower flange 118 includes a plurality of recesses 119 located to provide clearance for the retaining ridges 64 of the base 44 when the barrier member 54 is attached to the base 44. The barrier member 54 defines an opening 120 on its lower end, and the upper slide member 46 and the base 44 pass through the opening 120 when attaching the barrier member 54.

The barrier member 54 also includes at least one retaining rail, generally indicated at 122, for operatively attaching the barrier member 54 to the base 44. In the embodiment shown, there are a plurality of first retaining rails 124, and a plurality of second retaining rails 126. The first retaining rails 124 are generally straight and extend downward from the lower flange 118 of the barrier member 54. The first retaining rails 124 are spaced opposite each other on the barrier member 54. The base 44 also includes at least one slot 128 of a shape and location corresponding to that of the first retaining rails 124. In the embodiment shown, there are slots 128 adjacent each retaining ridge 64 of the base 44. Each slot 128 is generally straight and extends through the retainer 58 of the base 44. As best shown in FIG. 4, the first retaining rails 124 of the barrier member 54 are retained within the corresponding slots 128 of the base 44 to operatively attach the barrier member 54 to the base 44. Each of the first retaining rails 124 also includes a bulbous head 130 to attach the barrier member 54 to the base 44 in a more robust manner.

The second retaining rails 126 are generally straight and extend downward from the lower flange 118 of the barrier member 54. The second retaining rails 126 each include a head 132, at which the rail 126 turns inward toward the center of the barrier member 54. The second retaining rails 126 are spaced opposite each other on the barrier member 54 and are located 90° away from the first retaining rails 124. The base 44 also includes recesses 134 on the periphery of the retainer 58 in locations corresponding to that of the second retaining rails 126. As best shown in FIG. 3, the second retaining rails 126 extend through the recesses 134, and the heads 132 are operatively attached to the bottom side 61 of the base 44. The tray 30 includes pockets 88 into which the second retaining rails 126 extend to allow the heads 132 to attach to the bottom side 61 of the base 44. In the preferred embodiment, the pockets 88 are sufficiently shallow such that the upper surface 32 of the tray 30 forces the second retaining rails 126 into the bottom side 61 of the base 44 for improved retention of the barrier member 54 to the base 44.

Furthermore, the upper surface 32 of the tray 30 includes at least one, and preferably, a plurality of posts 136. The posts 136 extend upwardly from the upper surface 32 of the tray 30 and are spaced opposite each other about the sensor assembly 42. The posts 136 are positioned and sized such that the posts 136 force the second retaining rails 126 of the barrier member 54 against the periphery of the retainer 58 of the base 44 as best shown in FIG. 3. Thus, the posts 136 further improve retention of the barrier member 54 to the base 44.

In the embodiment shown, the barrier member 54 and the upper surface 32 of the tray 30 cooperate to substantially encapsulate the upper slide member 46 and the base 44. Those of ordinary skill in the art, however, will recognize that the barrier member 54 could be configured to solely encapsulate the upper slide member 46 and the base 44 without departing from the scope of the invention.

The barrier member 54 is preferably made of a resiliently flexible material, such as rubber. As such, the barrier member 54 can flex and allow the upper slide member 46 to move relative to the base 44. The barrier member 54 inhibits contaminants, such as foam particles, rainwater, or other foreign substances, from contacting and detrimentally affecting the operation of the sensor assembly 42 and sensor 52. As such, the barrier members 54 extend the operating life of the vehicle occupant sensing system 28.

Referring now to FIGS. 5 through 8, a second embodiment of the vehicle occupant sensing system is generally indicated at 228 where like numerals increased by 200 are used to designate like structure with respect to the embodiment illustrated in FIGS. 2 through 4. The vehicle occupant sensing system 228 can be employed in the vehicle seat assembly 10 of FIG. 1.

Figure 5:
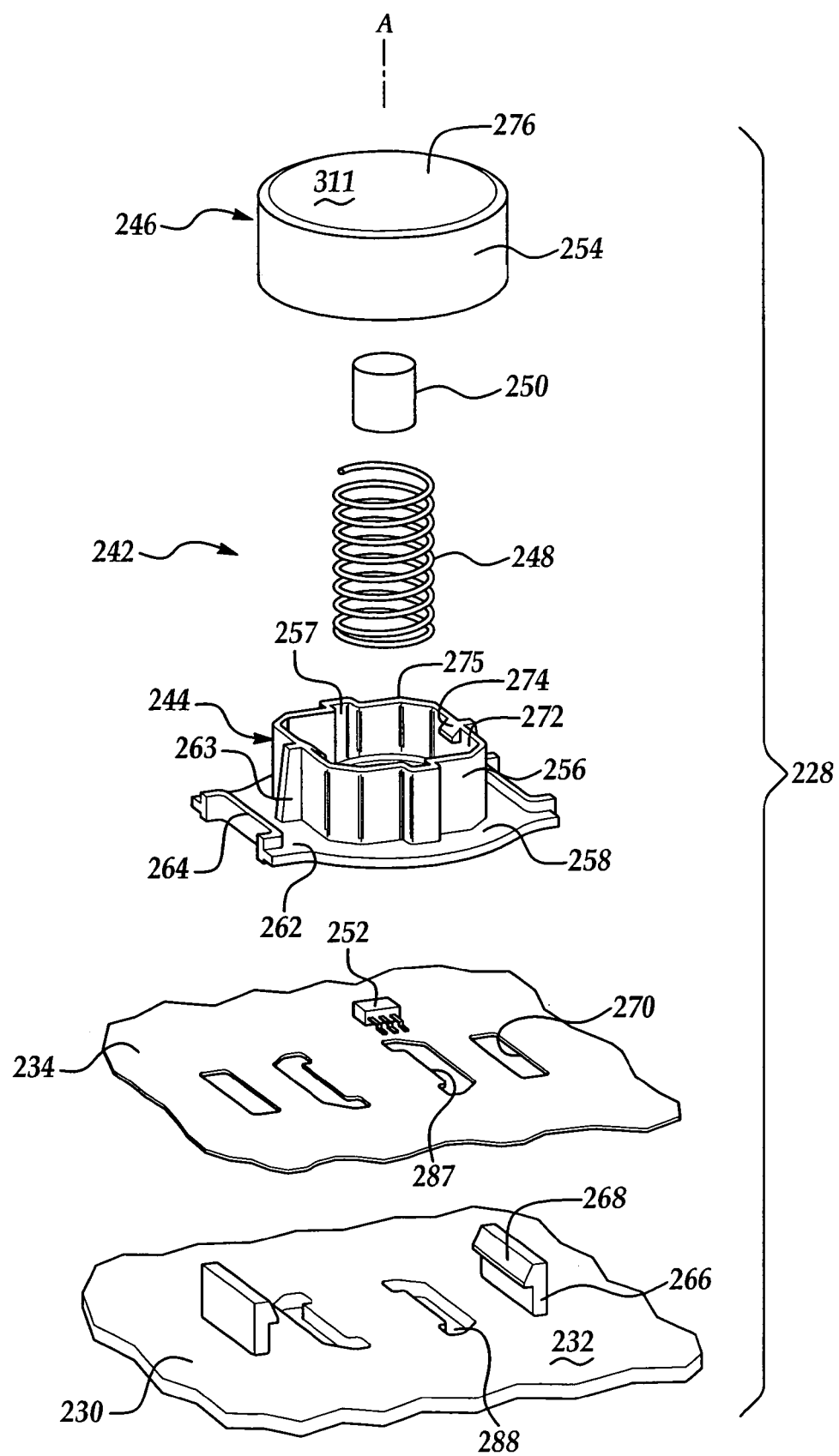
FIG. 5 is an exploded top view of another embodiment of a vehicle occupant sensing system having contamination barrier members.

The vehicle occupant sensing system 228 includes a circuit carrier tray 230 and a circuit carrier 234 that is similar to the embodiment shown in FIGS. 2 through 4 except as noted below. The vehicle occupant sensing system 228 also includes at least one, and preferably, a plurality of sensor assemblies, generally indicated at 242. Those having ordinary skill in the art will appreciate that although FIG. 5 shows only one sensor assembly 242, the vehicle occupant sensing system 228 of the present invention could employ any number of sensor assemblies 242, including an array of sensor assemblies 242 like that shown in FIG. 1.

The sensor assemblies 242 include a base, generally indicated at 244, and an upper slide member, generally indicated at 246. The upper slide member 246 is slidingly supported for movement toward and away from the base 244 as will be discussed in greater detail below. The sensor assembly 242 defines an interior cavity 308 (FIGS. 7 & 8). The sensor assembly 242 also includes a biasing member 248 that biases the upper slide member 246 away from the base 244. Furthermore, the vehicle occupant sensing system 228 includes at least one, and preferably, a plurality of emitters 250 similar to the emitters 50 discussed above in relation to FIGS. 2 through 4. The vehicle occupant sensing system 228 also includes at least one, and preferably, a plurality of sensors 252. Each sensor 252 is disposed in spaced relationship to a corresponding emitter 250, and the sensor 252 is operable to detect relative distance to the emitter 250. Each sensor assembly 242 includes an associated emitter 250 and sensor 252 as shown in FIGS. 5-8.

At least one of the emitter 250 and the sensor 252 is supported by the upper slide member 246 so as to be supported for movement toward and away from the other of the emitter 250 and the sensor 252. For instance, in the embodiment shown, the upper slide member 246 includes a retainer, generally indicated at 290 (FIGS. 6-8), and the emitter 250 is supported by the retainer 290. The sensor 252 is supported by the circuit carrier 234 and is disposed within the interior cavity 308 of the sensor assembly 242. As such, when the upper slide member 246 moves toward and away from the base 244, the emitter 250 moves with the upper slide member 246 toward and away from the sensor 252 for detecting the condition of the vehicle seat assembly 10 as will be discussed in greater detail below. The retainer 290 is open to the interior cavity 308 of the sensor assembly 24. The upper slide member 246 includes an exterior surface 311 that is continuous to thereby block contaminants from entering the sensor assembly 242 as will be discussed in greater detail below.

Specific features of the sensor assembly 242 and vehicle occupant sensing system 228 shown in FIGS. 5-8 will now be discussed. As shown, the base 244 generally includes a base guide 256 and a retainer 258. The retainer 258 is flat and is positioned atop the circuit carrier 234. The base guide 256 is generally tubular and is attached at one terminal end to the retainer 258, extending axially therefrom toward the seat cushion 16. The base 244 also includes an interior ridge 260 as shown in FIGS. 7 and 8. The interior ridge 260 is also tubular, is attached at one terminal end to the retainer 258, and extends axially from the retainer 258 toward the seat cushion 16. In the embodiment shown, the interior ridge 260 is disposed within the base guide 256 and is axially centered therein.

The retainer 258 includes a plurality of retaining ridges 264. The ridges 264 curve inward from the outer periphery of the retainer 258 and extend away from a topside 262 of the retainer 258 toward the seat cushion 16. In the embodiment shown, the ridges 264 are disposed on opposite sides of the retainer 258. The tray 230 includes a plurality of clips 266 for mounting the base 244 to the tray 230. The clips 266 each extend from the upper surface 232 of the tray 230, through apertures 270 in the circuit carrier 234, and toward the base 244 (FIG. 5). The clips 266 each include an enlarged head 268. To mount the base 244 to the tray 230, the base 244 is positioned between the heads 268 and moved axially toward the upper surface 232 of the tray 230. As the heads 268 contact the retaining ridges 264, the clips 266 bend outwardly. When the retaining ridges 264 move past the heads 268, the clips 266 resiliently bend back toward the retaining ridges 264 and the heads 268 move over the retaining ridges 264, thereby mounting the base 244 to the tray 230.

The base guide 256 has an inner surface 272 as shown in FIGS. 5, 7, and 8. The base guide 256 includes at least one, and preferably, a plurality of upper flange members 274. The flange members 274 are each triangular shaped, are disposed at ninety degrees (90°) away from each other on a rim 275 of the base guide 256, and face inwardly from the inner surface 272 toward the axis A. The inner surface 272 of the base guide 256 is used to guide movement of the upper slide member 246, and the upper flange members 274 are used to limit movement of the upper slide member 246 as will be discussed in greater detail below.

Figure 6:
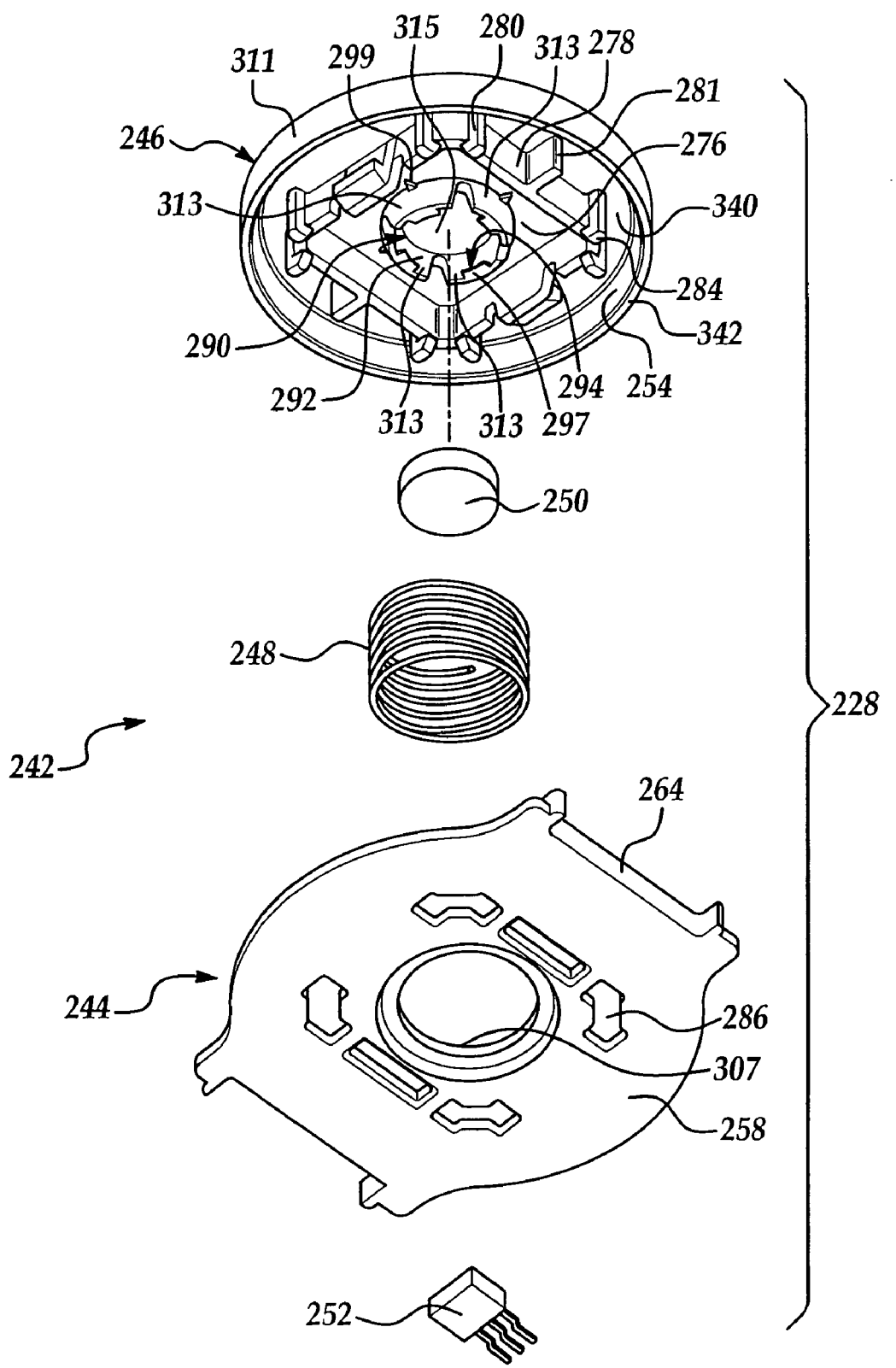
FIG. 6 is an exploded bottom view of the vehicle occupant sensing system of FIG. 5.
Figure 7:
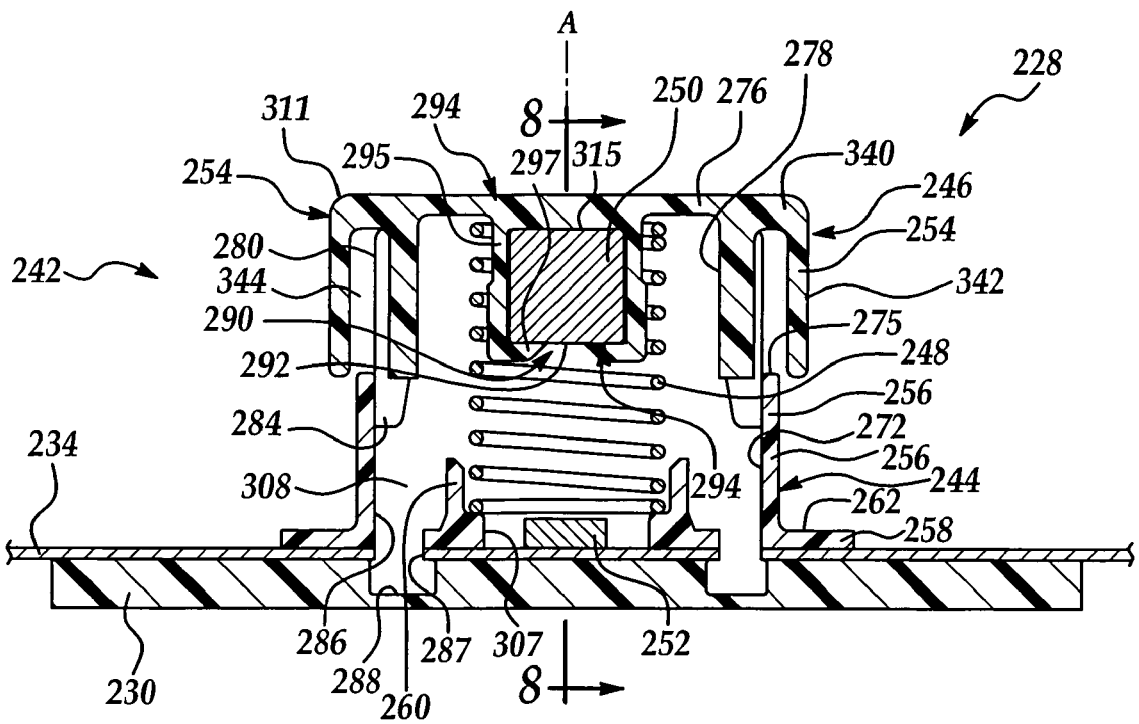
FIG. 7 is a cross-sectional side view of the sensor assembly of FIG. 5.
Figure 8:
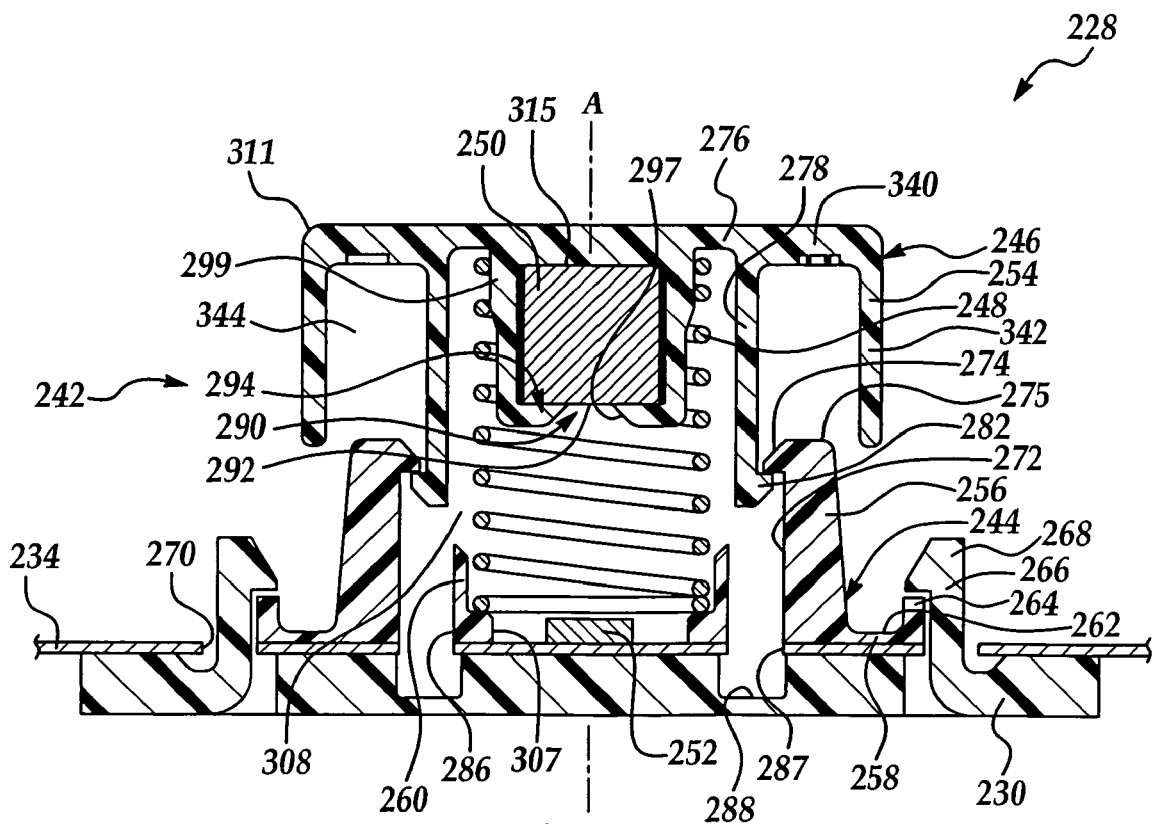
FIG. 8 is a cross-sectional side view of the sensor assembly of FIG. 7 taken along the line 8-8.

As shown in FIGS. 6-8, the upper slide member 246 includes an upper disc portion 276 and a support wall 278. The upper disc portion 276 is generally flat and is preferably disposed parallel to the retainer 258 of the base 244. The support wall 278 is generally rectangular and tubular and extends axially from the upper disc portion 276 toward the base 244. The support wall 278 is sized according to the inner surface 272 of the base guide 256 such that the support wall 278 can be moveably disposed within the base guide 256.

The upper slide member 246 also includes at least one, and preferably, a plurality of lower flange members 282 (FIGS. 6 and 8). The lower flange members 282 are each triangular shaped and extend from a lower edge of the support wall 278 away from the axis A. The lower flange members 282 are disposed on the upper slide member 246 according to that of the upper flange members 274 of the base 244.

To attach the upper slide member 246 to the base 244, the upper slide member 246 is moved axially toward the base 244 until the lower flange members 282 contact the upper flange members 274. Further movement of the upper slide member 246 moves the lower flange members 282 toward the axis A, and once the lower flange members 282 move past the upper flange members 274, the lower flange member 282 resiliently move underneath the upper flange members 274. Once attached, the biasing member 248 biases the upper slide member 246 away from the base 244 into a fully extended position (FIGS. 7 and 8) in which the lower flange members 282 contact the upper flange members 274. The upper slide member 246 can also be moved against the biasing force of the biasing member 248 toward the base 244 such that the support wall 278 of the upper slide member 246 moves axially within the interior of the base 244.

As shown in FIGS. 6 and 7, the upper slide member 246 includes at least one, and preferably, a plurality of ribs 280. The ribs 280 can be built according to applicant's co-pending application Ser. No. 11/085,914, entitled "Vehicle Occupant Sensing System Having Guiding Ribs," and filed Mar. 22, 2005, which is hereby incorporated in its entirety by reference. Each rib 280 extends axially along the support wall 278 and away from the axis A. The ribs 280 are spaced apart from each other about the support wall 278. For instance, in the embodiment shown, there are a plurality of ribs 280 disposed adjacent the corners of the support wall 278. Preferably, each of the ribs 280 contacts the inner surface 272 of the base guide 256 as shown in FIG. 7. Contact between the ribs 280 and the inner surface 272 of the base 244 guides sliding movement of the upper slide member 246 within the base 244. Specifically, the upper slide member 246 is substantially inhibited from tilting relative to the base 244 because of the contact between the ribs 280 and inner surface 272 of the base 244. Furthermore, the ribs 280 reduce surface area contact between the upper slide member 246 and the inner surface 272 of the base 244. In turn, the ribs 280 reduce friction between the upper slide member 246 and the base 244 as the upper slide member 246 moves. The ribs 280 and the inner surface 272 can also be polished in order to further reduce friction.

In the embodiment shown, the ribs 280 include lower ends 284 (FIGS. 6 and 7) extending away from the lower edge of the support wall 278. The retainer 258 of the base 244 includes at least one, and preferably, a plurality of first openings 286 (FIGS. 6-8). The circuit carrier 234 also includes at least one, and preferably, a plurality of second openings 287 (FIGS. 5, 7, and 8), and the tray 230 includes at least one, and preferably, a plurality of pockets 288 (FIGS. 5, 7, and 8). In the preferred embodiment, the number and size of the first openings 286, second openings 287, and pockets 288 correspond with that of the ribs 280. Also, the first openings 286, second openings, and pockets 288 are axially aligned with the ribs 280 such that the ribs 280 can extend through the first and second openings 286, 287 and into the pockets 288 when the upper slide member 246 moves toward the base 244. As such, the upper slide member 246 can move an increased distance toward the base 244 such that the sensor assembly 242 is less likely to detrimentally affect the comfort of the vehicle seat assembly 10.

The sensor assembly 242 also includes a plurality of U-shaped channels 257 (FIG. 5) that extend away from the interior of the base guide 256 and a plurality of stiffening ribs 263 that extend axially from the base guide 256 away from the axis A. In the embodiment shown, the channels 257 are disposed on opposite sides of the base guide 256, the stiffening ribs 263 are also disposed on opposite sides of the base guide 256, and the channels 257 are disposed ninety degrees (90°) away from the stiffening ribs 263.

The upper slide member 246 also includes at least one, and preferably, a plurality of alignment ribs 281 (FIG. 6). The alignment ribs 281 are attached to the support wall 278 and extend away from the axis A. Preferably, the number, size, and location of the alignment ribs 281 correspond to that of the channels 257 of the base 244. When the upper slide member 246 is attached to the base 244, the alignment ribs 281 are disposed within the channels 257 and move axially therein when the upper slide member 246 moves. However, the alignment ribs 281 and channels 257 abut if the upper slide member 246 rotates about the axis A. Because rotation of the upper slide member 246 is substantially inhibited, the orientation of the emitter 250 remains more consistent in relation to the sensor 252 such that the vehicle occupant sensing system 228 provides more accurate detection of the condition of the vehicle seat assembly 10.

The upper slide member 246 also includes at least one contamination barrier member 254 (FIGS. 6-8). The contamination barrier members 254 can be built according to applicant's co-pending application entitled "Vehicle Occupant Sensing System Having a Contamination Barrier Member," Ser. No. 11/086,844, and filed Mar. 22, 2005, which is hereby incorporated in its entirety by reference. In the embodiment shown, the contamination barrier member 254 includes a ring 340 and a skirt 342. The ring 340 is attached to the upper slide member 246 and is concentric with the upper disc portion 276. Preferably, the ring 340 substantially extends over the base 244 to block contaminants from entering the interior cavity 308 of the sensor assembly 242. The skirt 342 generally extends from the outer periphery of the ring 340 toward the base 244 and substantially over the support wall 278 to further block contaminants from entering the interior cavity 308 of the sensor assembly 242. Preferably, the skirt 342 extends far enough toward the base 244 in order to at least partially surround and enclose the rim 275 of the base 244 when the upper slide member 246 is in its fully extended position away from the base 244. As such, the contamination barrier member 254 shields the sensor assembly 242 from contaminants when the upper slide member 246 is in its fully extended position. When the upper slide member 246 moves toward the base 244, the contamination barrier member 254 continues to shield the sensor assembly 242. Specifically, the skirt 342 and the support wall 278 of the upper slide member 246 are disposed in spaced relationship as shown in FIGS. 7 and 8 to define a cavity 344. The base guide 256 is adapted to be disposed within the cavity 344 when the upper slide member 246 moves toward the base 244. The ring 340 moves closer to the subject area 309, and the skirt 342 moves over the base guide 256 for added protection from contaminants. In the preferred embodiment, the skirt 342 is integrally attached to the ring 340, and the ring 340 is integrally attached to the upper slide member 246.

As noted above, the sensor assembly 242 includes a biasing member 248. The biasing member 248 is a coiled spring in the embodiment shown. As best shown in FIGS. 7 and 8, one end of the biasing member 248 is supported on the retainer 258 and within the interior ridge 260 of the base 244. The opposite end of the biasing member 248 is disposed about the retainer 290 such that the biasing member 248 biases the upper slide member 246 away from the base 244. Preferably, the biasing member 248 causes the lower flange members 282 of the upper slide member 246 to contact the upper flange members 274 of the base 244 when the seat cushion is unoccupied. Furthermore, in the embodiment shown, the upper slide member 246 includes at least one, and preferably, a plurality of retention members 299 (FIGS. 6 and 8). The retention members 299 can be built according to applicant's co-pending application Ser. No. 11/085,915, entitled "Vehicle Occupant Sensing System Having a Retention Member for a Biasing Member," and filed Mar. 22, 2005, which is hereby incorporated in its entirety by reference. In the embodiment shown, there is a plurality of triangular-shaped retention members 299 extending radially on the underside of the upper disc portion 276 and away from the retainer 290. The retention members 299 are evenly spaced about the retainer 290. As shown in FIG. 8, the biasing member 248 is mounted to the upper slide member 246 by positioning the retention members 299 within the biasing member 248. The retention members 299 are held relative to the biasing member 248 by friction. By reducing surface area contact between the upper slide member 246 and the biasing member 248, the retention members 299 reduce friction as the upper slide member 246 moves toward the base 244, thereby reducing signal noise of the sensor 252.

The sensor 252 is operable to detect the relative distance to the emitter 250 similar to the embodiment described above in relation to FIGS. 2-4. Because the emitter 250 is mounted to the upper slide member 246, the sensor 252 is operable to detect movement of the upper slide member 246 toward and away from the base 244. Thus, when the seat cushion 16 is occupied, the upper slide members 246 of each sensor assembly 242 slide accordingly toward the respective bases 244, and the sensors 252 detect the change in distance to the respective emitters 250. The sensors 252 transmit correlative signals to the controller 38, and the controller 38 sends output to the restraint system 40 based on those signals. It should be appreciated that when the seat cushion 16 is unoccupied, the sensors 252 can also detect the relative distance to the respective emitters 250 to detect that the seat assembly 10 is unoccupied as well. Therefore, operation of the restraint system 40 can depend on the condition of the seat assembly 10. For instance, assuming the restraint system 40 is an airbag system and that the vehicle occupant sensing system 228 detects that the seat assembly 10 is unoccupied, the restraint system 40 can disengage and prevent the airbag from deploying. Likewise, if the vehicle occupant sensing system 228 detects that the occupant weighs a certain amount and/or that the occupant is sitting in a certain position, the airbag can be inflated in a manner that safely restrains such an occupant.

As mentioned above, the upper slide member 246 includes a retainer 290 best seen in FIGS. 6-8. In the embodiment shown, the retainer 290 includes a plurality of wall members 313 that extend axially toward the base 250 (FIG. 6). The wall members 313 are disposed in spaced relation to each other and are arranged symmetrically about the axis A of the sensor assembly 242 in the preferred embodiment. The wall members 313 are preferably integrally attached to the upper slide member 246. The retainer 290 includes an open end 292 that generally faces the base 244. The emitter 250 moves through the open end 292 in order to be supported by the upper slide member 246 as will be described in greater detail below.

In the embodiment shown, the upper slide member 246 also includes at least one interference member, generally indicated at 294 (FIGS. 6-8). The interference member 294 can be built according to applicant's co-pending application, U.S. Ser. No. 10/899,192, entitled "Vehicle Occupant Sensing System Having an Upper Slide Member with an Emitter Interference Member" and filed Jul. 26, 2004. In the embodiment shown, each interference member 294 is a head 297 (FIGS. 6-8) that extends radially from a lower edge of the respective wall member 313 toward the axis A. Also, the retainer 290 includes a backstop 315 defined by the underside of the upper disc portion 276 between the wall members 313 of the retainer 290.

To attach the emitter 250 to the upper slide member 246, the emitter 250 is moved axially toward the open end 292, and by contacting the heads 297, the emitter 250 forces the wall members 313 to move away from the axis A. Further axial movement of the emitter 250 allows the wall members 313 to resiliently flex back toward the axis A such that the wall members 313 are disposed about the emitter 250. Preferably, when the emitter 250 is disposed in the retainer 290, the wall members 313, the heads 297, and the backstop 315 cooperate to support the emitter 250. For instance, the wall members 313 extend over the sides of the emitter 250, the heads 297 extend over the bottom of the emitter 250, and the backstop 315 extends over the top of the emitter 250. In one embodiment, the wall members 313, the heads 297, and the backstop 315 each frictionally contact the emitter 250 such that the emitter 250 is substantially fixed to the upper slide member 246.

As such, the emitter 250 is generally exposed to the interior cavity 309 of the sensor assembly 242. Also, the exterior surface 311 of the upper slide member 246 (i.e., the top of the upper disc portion 276, the top of the ring 340, and the outer radial surface of the skirt 342) is continuous without openings to thereby block contaminants from entering the sensor assembly 242 and detrimentally affecting the sensor 252. Also, the ribs 280 of the upper slide member 246 and the inner surface 272 of the base guide 256 are shielded from contaminants to thereby ensure proper sliding movement of the upper slide member 246. Accordingly, the sensor assembly 242 is substantially enclosed to thereby extend the operating life of the vehicle occupant sensing system 228.

The present invention has been described in an illustrative manner. It is to be understood that the terminology used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A vehicle seat assembly comprising:
a seat cushion with a lower surface; and
a vehicle occupant sensing system disposed adjacent said lower surface of said seat cushion, said vehicle occupant sensing system including at least one emitter, at least one sensor disposed in spaced relationship to said emitter and operable to detect relative distance to said emitter to thereby detect the condition of the vehicle seat assembly, and at least one sensor assembly with a base, an upper slide member slidingly supported for movement toward and away from said base, and a contamination barrier assembly, said base including a base guide extending toward said upper slide member, said upper slide member includes a disk and a support wall extending toward said base, said contamination barrier member including a skirt disposed in spaced parallel relationship to said support wall so as to define a cavity therebetween and that is adapted to receive said base guide, said disk, support wall and said skirt cooperating to define an exterior surface that is continuous to thereby block contaminants from entering said sensor assembly, and wherein at least one of said emitter and said sensor is supported by said upper slide member.

2. A vehicle occupant sensing system as set forth in claim 1 wherein said upper slide member includes a retainer, wherein at least one of said emitter and said sensor is supported by said retainer.

3. A vehicle occupant sensing system as set forth in claim 2 wherein said retainer includes a plurality of wall members disposed in spaced relation to each other and disposed about at least one of said emitter and said sensor.

4. A vehicle occupant sensing system as set forth in claim 2 wherein said retainer includes an open end and said open end generally faces said base.

5. A vehicle occupant sensing system as set forth in claim 2 wherein said retainer includes at least one interference member, and wherein said interference member extends over at least one of said emitter and said sensor to thereby retain at least one of said emitter and said sensor in said retainer.

6. A vehicle occupant sensing system as set forth in claim 2 wherein said retainer is integrally attached to said upper slide member.

* * * * *